United States Patent Office 3,809,753
Patented May 7, 1974

3,809,753
ANTITHROMBOTIC AGENTS
Robert Douglas MacKenzie, Cincinnati, Ohio, and Charles Harmon Tilford, Atlanta, Ga., assignors to Richardson-Merrell Inc., New York, N.Y.
No Drawing. Filed Mar. 8, 1973, Ser. No. 339,147
Int. Cl. A61k 27/00
U.S. Cl. 424—250    14 Claims

ABSTRACT OF THE DISCLOSURE

Pyrrolemethylamine derivatives useful as antithrombotic agents are compounds having the formula

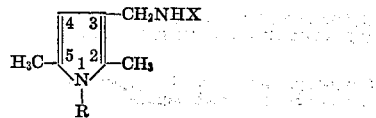

wherein R is a hydrocarbon radical or a nitrogen-containing hydrocarbon radical and X is a substituted aminoalkyl radical.

FIELD OF INVENTION

This invention is directed to the use of certain pyrrolemethylamine derivatives in the treatment of thrombotic conditions.

SUMMARY OF THE INVENTION

This invention is directed to the use of pyrrolemethylamine derivatives of the following general Formula I in the treatment of thrombotic conditions resulting from the aggregation of blood platelets.

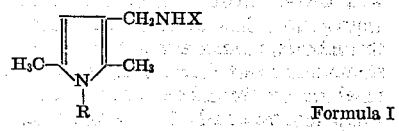

Formula I wherein R is cycloalkyl of 5 to 7 carbon atoms, pyridyl, methylpyridyl, quinolyl, phenyl, a mono- or di-substituted phenyl group in which case the substituents may be halogen, lower alkyl of 1 to 3 carbon atoms, lower alkoxy of 1 to 4 carbon atoms or di(lower)alkylamino having 1 to 4 carbon atoms in each alkyl group, or aralkyl such as phenethyl or α-methylbenzyl; and X is (A) the group

wherein A is a straight or branched alkylene chain of 2 to 6 carbon atoms; $R^1$ and $R^2$ may be the same or different and represent hydrogen, lower alkyl of 1 to 3 carbon atoms, hydroxyalkyl, di-(lower)alkylaminoalkyl, cycloalkyl of from 5 to 7 carbon atoms, phenyl, phenyl substituted with lower alkyl, or $R^1$ and $R^2$ together with the nitrogen atom to which they are attached may be a saturated heterocyclic group such as pyrrolidino, piperidino, morpholino, piperazino or N-(lower alkyl)piperazino; (B) the group

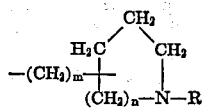

wherein m is a whole integer of from 0 to 3 with the proviso that when m is 0 the point of attachment of X may not be at either carbon atom alpha to the nitrogen atom; n is a whole integer of 1 to 2 and $R^3$ is hydrogen or lower alkyl; or (C) the group

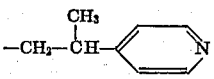

and the acid addition salts of said compounds.

As examples of the radicals which R may represent in compounds of this invention having the above formula, there may be mentioned, for example, cyclopentyl, cyclohexyl, cycloheptyl, phenyl, a phenyl radical substituted by one or two substituents selected from halogen, lower alkyl such as methyl, ethyl, or propyl, lower alkoxy such as methoxy, ethoxy or propoxy, and di-loweralkylamino such as dimethylamino, diethylamino and the like; as well as such radicals as α-methylbenzyl, phenethyl, pyridyl, methylpyridyl and quinolyl.

As examples of the substituents which $R^1$ and $R^2$ may represent in the compounds of this invention having the above formula, there may be mentioned for example alkyl such as methyl, ethyl, propyl; hydroxyalkyl such as, hydroxyethyl, hydroxypropyl and the like; di(lower)alkylaminoalkyl such as dimethylaminoethyl and diethylaminoethyl and the like; cycloalkyl such as cyclopentyl, cyclohexyl, cycloheptyl, as well as phenyl and lower alkyl substituted phenyl such as methylphenyl, ethylphenyl and the like. Additionally, $R^1$ and $R^2$ together with the nitrogen atom to which they are attached may represent a saturated heterocyclic group such as pyrrolidino, piperidino, morpholino, piperazino and N-(lower alkyl)piperazino.

As examples of the substituents which A may represent in the compounds of this invention having the above formula, there may be mentioned for example, ethylene, propylene, butylene, pentylene and hexylene, β-methylpropylene and the like.

The invention also includes the pharmaceutically acceptable acid addition salts of the compounds of the hereinbefore set forth formula such as those salts with inorganic acids such as, for example, hydrochloric, hydrobromic, sulphuric, phosphoric acids and the like and with organic carboxylic acids such as for example, acetic, propionic, glycolic, lactic, pyruvic, malonic, succinic, fumaric, malic, tartaric, citric, ascorbic, maleic, hydroxymaleic, dihydroxymaleic, benzoic, phenylacetic, 4-aminobenzoic, 4-hydroxybenzoic, anthranilic, cinnamic, salicylic, 4-aminosalicylic, 2-phenoxybenzoic, 2-acetoxybenzoic acid and the like. As examples of compounds of this invention there may be mentioned for example:

N-(3-aminopropyl)-2,5-dimethyl-1-[2(m-xylyl)]-3-pyrrolemethylamine,
1-cyclohexyl-2,5-dimethyl-N-(4-piperidylmethyl)-3-pyrrolemethylamine, 2,5-dimethyl-1-(6-methyl-2-pyridyl)-N-(2-piperazino-
  ethyl)-3-pyrrolemethylamine,
2,5-dimethyl-N-(4-piperidylmethyl)-1-(8-quinolyl)-3-
  pyrrolemethylamine,
1-(2,5-dimethoxyphenyl)-2,5-dimethyl-N-(4-piperidyl-
  methyl)-3-pyrrolemethylamine,
2,5-dimethyl-1-(α-methylbenzyl)-N-(4-piperidylmethyl)-
  3-pyrrolemethylamine,
1-(2,6-dichlorophenyl)-2,5-dimethyl-N-(4-piperidyl-
  methyl)-3-pyrrolemethylamine,
2,5-dimethyl-N-(4-piperidylmethyl)1-[2-(m-xylyl)]-3-
  pyrrolemethylamine,
2,5-dimethyl-1-[p-(dimethylamino)phenyl]-N-(4-
  piperidylmethyl)-3-pyrrolemethylamine,
2,5-dimethyl-1-phenethyl-N-(4-piperidylmethyl)-3-
  pyrrolemethylamine,
2,5-dimethyl-N-(4-piperidylmethyl)-1-(3-pyridyl)-3-
  pyrrolemethylamine,
2,5-dimethyl-1-phenyl-N-(3-piperazinopropyl)-3-
  pyrrolemethylamine,
N-(3-aminopropyl)-2,5-dimethyl-1-phenyl-3-pyrrolemeth-
  ylamine,
N-{3-[(2-hydroxyethyl)amino]propyl}-2,5-dimethyl-1-
  phenyl-3-pyrrolemethylamine,
N-[2-(N-ethyl-m-toluidino)ethyl]-2,5-dimethyl-1-phenyl-
  3-pyrrolemethylamine,
N-[3-(cyclohexylamino)propyl]-2,5-dimethyl-1-phenyl-
  3-pyrrolemethylamine,
N-(3-dimethylaminopropyl)-2,5-dimethyl-1-phenyl-3-
  pyrrolemethylamine,
N-{2-[2-(diethylamino)ethylamino]ethyl}-2,5-dimethyl-
  1-phenyl-3-pyrrolemethylamine,
2,5-dimethyl-1-phenyl-N-(2-pyrrolidinoethyl)-3-pyrrole-
  methylamine,
2,5-dimethyl-N-[2-(1-methyl-2-pyrrolidyl)ethyl]-1-
  phenyl-3-pyrrolemethylamine,
N-(1-ethyl-3-piperidyl)-2,5-dimethyl-1-phenyl-3-pyrrole-
  methylamine,
2,5-dimethyl-N-(3-morpholinopropyl)-1-phenyl-3-pyrrole-
  methylamine,
2,5-dimethyl-1-phenyl-N-[2-(4-pyridyl)propyl]-3-pyrrole-
  methylamine,
2,5-dimethyl-N-(4-piperidylmethyl)-1-(2-pyridyl)-3-
  pyrrolemethylamine,
2,5-dimethyl-1-phenyl-N-(2-piperazinoethyl)-3-pyrrole-
  methylamine,
2,5-dimethyl-1-phenyl-N-(4-piperidylmethyl)-3-pyrrole-
  methylamine,
2,5-dimethyl-1-phenyl-N-[2-(4-piperidyl)ethyl]-3-pyr-
  rolemethylamine,
2,5-dimethyl-N-[2-(4-piperidyl)ethyl]-1-[2(m-xylyl)]-
  3-pyrrolemethylamine,
2,5-dimethyl-N-[3-(4-methylpiperazino)propyl]-1-phen-
  yl-3-pyrrolemethylamine,
N-[(2,5-dimethyl-1-[2-(m-xylyl)]-3-pyrrolyl)methyl]-
  1,3-propanediamine,
and the like.

The compounds of general Formula I may be prepared by reacting an appropriately N-substituted-2,5-dimethyl-pyrrolecarboxaldehyde with an appropriate primary amine to form the corresponding pyrrolemethylimine which is subsequently reduced.

Methods of preparing the compounds of this invention and the preparation of specific examples of compounds of general Formula I are set forth in copending application Ser. No. 37,313 filed May 14, 1970, now U.S. Pat. 3,721,673, on from p. 6, line 15 through p. 19 and are incorporated herein by reference thereto.

The compounds disclosed herein are a special type of anticoagulant agent exerting their effectiveness on the aggregation of blood platelets. The aggregation of blood platelets is an important factor in the coagulation of blood, and as the degree of platelet aggregation increases the tendency of thrombus formation also increases. The in vitro data contained in Table I demonstrates the effect of the compounds of this invention on platelet aggregation. The test compounds were added to adenosine diphosphate treated human platelet rich plasma, and the percent inhibition of platelet aggregation, as compared to control to which no test compound was added, was measured by an aggregometer.

TABLE I

| Test compound | Dose, microgram/ml. | Percent inhibition |
|---|---|---|
| 2,5-dimethyl-N-(4-poperidylmethyl)-1-[2-(m-xylyl)]-3-pyrrolemethylamine. | 3<br>30<br>30<br>100 | 27<br>55<br>96<br>100 |
| 2,5-dimethyl-N-[2-(4-piperidyl)ethyl]-1-[2(m-xylyl)]-3-pyrrolemethylamine. | 3<br>10<br>30 | 25<br>52<br>100 |
| N-[(2,5-dimethyl-1-[2-(m-xylyl)]-3-pyrrolyl)methyl]-1,3-propanediamine. | 3<br>10<br>30 | 6<br>54<br>100 |
| 2,5-dimethyl-1-(α-methylbenzyl)-N-(4-piperidylmethyl)-3-pyrrolemethylamine. | 3<br>10<br>30 | 3<br>82<br>100 |
| 1-cyclohexyl-2,5-dimethyl-N-(4-piperidylmethyl)-3-pyrrolemethylamine. | 3<br>10<br>30<br>100 | 11<br>14<br>94<br>100 |
| 1-(2,6-dichlorophenyl)-2,5-dimethyl-N-(4-piperidylmethyl)-3-pyrrolemethylamine. | 3<br>10<br>30 | 18<br>69<br>100 |
| 2,5-dimethyl-1-phenethyl-N-(4-piperidylmethyl)-3-pyrrolemethylamine. | 10<br>30 | 39<br>83 |
| N-(3-aminopropyl)-2,5-dimethyl-1-phenyl-3-pyrrolemethylamine. | 10<br>30<br>100 | 18<br>78<br>100 |
| 2,5-dimethyl-1-phenyl-N-[2-(4-piperidyl)ethyl]-3-pyrrolemethylamine. | 3<br>10<br>30<br>100 | 12<br>4<br>62<br>100 |
| 2,5-dimethyl-1-phenyl-N-(4-piperidylmethyl)-3-pyrrolemethylamine. | 10<br>30<br>100 | 29<br>76<br>100 |
| 2,5-dimethyl-1-phenyl-N-(2-piperazinoethyl)-3-pyrrolemethylamine. | 10<br>30<br>100 | 6<br>44<br>100 |

The effect of the compounds of this invention on platelet aggregation renders them useful in the treatment of well known thrombotic conditions resulting from platelet aggregation. Such conditions include, for example, arterial thrombosis, pulmonary embolism, cerebrovascular disease, rheumatic heart disease, myocardial infarction, thrombophlebitis or thromboembolic conditions which may develop spontaneously following surgery, trauma or disease processes such as coronary occlusion and congestive heart failure. The compounds of this invention are also useful extrinsically as set forth in Table I, for example, in preventing the clotting of blood during transfusion.

The compounds of this invention are administerable orally or parenterally to animals, particularly warm blooded animals and mammals either alone or in the form of pharmaceutical preparations containing as the active ingredient compounds of this invention to achieve the desired effect. Pharmaceutical preparations containing compounds of this invention and conventional pharmaceutical carriers can be employed in unit dosage forms such as solids, for example, tablets, pills and capsules, or liquid solutions, suspensions or elixirs for oral administration, or liquid solution, suspensions, emulsions, and the like for parenteral use. The quantity of compound administered can vary over a wide range to provide from about 0.1 mg./kg. (milligrams per kilogram) to about 75 mg./kg. of body weight of the patient per day. Unit doses of these compounds can contain from about 5 to 250 mg. of the compound and may be administered, for example, from 1 to 4 times daily. Following are illustrative examples of pharmaceutical preparations containing compounds of general Formula I.

An illustrative composition for tablets is as follows:

| | Mg. per tablet |
|---|---|
| (a) 2,5-dimethyl-N-(4 - piperidylmethyl)-1-[2-(m-xylyl)]-3-pyrrolemethylamine | 100.0 |
| (b) Wheat starch | 15.0 |
| (c) Lactose | 33.5 |
| (d) Magnesium stearate | 1.5 |

A portion of the wheat starch is used to make a granulated starch paste which together with the remainder of the wheat starch and the lactose is granulated, screened and mixed with the active ingredient (a), and the magnesium stearate. The mixture is compressed into tablets weighing 150 mg. each.

An illustrative composition for a parenteral injection is the following wherein the quantities are on a weight to volume basis.

| | Amount |
|---|---|
| (a) N-(3 - aminopropyl)-2,5-dimethyl-1-phenyl-3-pyrrolemethylamine | mg__ 100.0 |
| (b) Sodium chloride | q.s. |
| (c) Water for injection to make | ml__ 20.0 |

The composition is prepared by dissolving the active ingredient (a) and sufficient sodium chloride in water for injection to render the solution isotonic. The composition may be dispensed in a single ampule containing 100 mg. of the active ingredient for multiple dosage or in 20 ampules for single dosage.

An illustrative composition for hard gelatin capsules is as follows:

| | Amount mg. |
|---|---|
| (a) 2,5-dimethyl - N - [2-(4-piperidyl)ethyl]-1-[2-(m-xylyl)]-3-pyrrolemethylamine | 200.0 |
| (b) Talc | 35.0 |

The composition is prepared by passing the dry powders of (a) and (b) through a fine mesh screen and mixing them well. The powder is then filled into No. 0 hard gelatin capsules at a net fill of 235 mg. per capsule.

An illustrative composition for pills in the following:

| | Per pill |
|---|---|
| (a) 1-(2,6-dichlorophenyl)-2,5-dimethyl - N - (4-piperidylmethyl)-3-pyrrolemethylamine | mg__ 200.0 |
| (b) Corn starch | mg__ 130.0 |
| (c) Liquid glucose | ml__ 20.0 |

The pills are prepared by blending the active ingredient (a) and the corn starch, then adding the liquid glucose with thorough kneading to form a plastic mass from which the pills are cut and formed.

What is claimed is:

1. A method of treating thrombotic conditions resulting from an aggregation of blood platelets which comprises administering to a patient in need thereof an effective amount of a compound selected from the formula

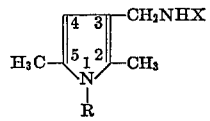

wherein R is selected from cycloalkyl of 5 to 7 carbon atoms, pyridyl, methylpyridyl, quinolyl, phenyl, a mono- or di-substituted phenyl group in which case the substituents are selected from halogen, lower alkyl of 1 to 3 carbon atoms, lower alkoxy of 1 to 4 carbon atoms or di(lower)alkylamino having 1 to 4 carbon atoms in each alkyl group, or aralkyl selected from phenethyl or α-methylbenzyl; and X is selected from (A) the group

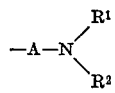

wherein A is selected from a straight or branched alkylene chain of 2 to 6 carbon atoms; $R^1$ and $R^2$ may be the same or different and are selected from hydrogen, lower alkyl of 1 to 3 carbon atoms, hydroxyalkyl, di(lower)alkylaminoalkyl, cycloalkyl of from 5 to 7 carbon atoms, phenyl, phenyl substituted with lower alkyl, or $R^1$ and $R^2$ together with the nitrogen atom to which they are attached may be a saturated heterocyclic group selected from pyrrolidino, piperidino, morpholino, piperazino or N-(lower alkyl) piperazino;

(B) the group

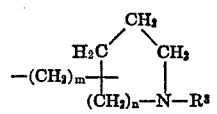

wherein $m$ is a whole integer of from 0 to 3 with the proviso that when $m$ is 0 the point of attachment of X may not be at either carbon atom alpha to the nitrogen atom; $n$ is a whole integer of 1 or 2 and $R^3$ is selected from hydrogen or (lower)alkyl; or (C) the group

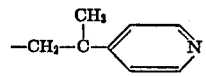

or a pharmaceutically acceptable acid addition salt thereof.

2. A method of claim 1 wherein R is selected from the group consisting of cycloalkyl of 5 to 7 carbon atoms, pyridyl, phenyl, phenethyl, α-methylbenzyl, or a mono- or di-substituted phenyl group in which case the substituents are selected from halogen, lower alkyl of 1 to 3 carbon atoms, or lower alkoxy of 1 to 4 carbon atoms.

3. A method of claim 2 wherein X is the group

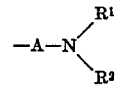

wherein A is selected from an alkylene chain of 2 or 3 carbon atoms; $R^1$ and $R^2$ may be the same or different and are selected from hydrogen, lower alkyl of 1 to 3 carbon atoms, or $R^1$ and $R^2$ taken together with the nitrogen atom to which they are attached may be a saturated heterocyclic group selected from pyrrolidino, piperidino, morpholino, piperazino, or N-(lower alkyl)piperazino; or a pharmaceutically acceptable acid addition salt thereof.

4. A method of claim 3 wherein the compound is 2,5-dimethyl-1-phenyl-N-(2 - piperazinoethyl)-3-pyrrolemethylamine or a pharmaceutically acceptable acid addition salt thereof.

5. A method of claim 3 wherein the compound is N-(3-aminopropyl)-2,5-dimethyl-1-phenyl - 3 - pyrrolemethylamine or a pharmaceutically acceptable acid addition salt thereof.

6. A method of claim 3 wherein the compound is N-[(2,5-dimethyl-1-[2-(m - xylyl)] - 3 - pyrrolyl)methyl]-1,3-propanediamine or a pharmaceutically acceptable acid addition salt thereof.

7. A method of claim 2 wherein X is the group

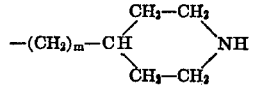

wherein $m$ is the integer 1 or 2; or a pharmaceutically acceptable acid addition salt thereof.

8. A method of claim 7 wherein the compound is 2,5-dimethyl-N-(4-piperidylmethyl) - 1 - [2 - (m-xylyl)]-3-pyrrolemethylamine or a pharmaceutically acceptable acid addition salt thereof.

9. A method of claim 7 wherein the compound is 2,5-dimethyl-N-[2-(4-piperidyl)ethyl] - 1 - [2-(m-xylyl)]-3-pyrrolemethylamine or a pharmaceutically acceptable acid addition salt thereof.

10. A method of claim 7 wherein the compound is 2,5-dimethyl-1-(α-methylbenzyl) - N - (4-piperidylmethyl)-3-pyrrolemethylamine or a pharmaceutically acceptable acid addition salt thereof.

11. A method of claim 7 wherein the compound is 1-cyclohexyl-2,5-dimethyl-N-(4-piperidylmethyl) - 3 - pyrrolemethylamine or a pharmaceutically acceptable acid addition salt thereof.

12. A method of claim 7 wherein the compound is 1-(2,6-dichlorophenyl)-2,5-dimethyl - N - (4-piperidylmethyl)-3-pyrrolemethylamine or a pharmaceutically acceptable acid addition salt thereof.

13. A method of claim 7 wherein the compound is 2,5-dimethyl-1-phenyl-N-[2-(4-piperidyl)ethyl] - 3 - pyrrolemethylamine or a pharmaceutically acceptable acid addition salt thereof.

14. A method of treating blood to prevent platelet aggregation which comprises incorporating into the blood an effective quantity of a compound selected from the formula

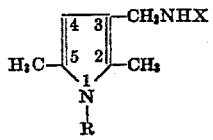

wherein R is selected from cycloalkyl of 5 to 7 carbon atoms, pyridyl, methylpyridyl, quinolyl, phenyl, a mono- or di-substituted phenyl group in which case the substituents are selected from halogen, lower alkyl or 1 to 3 carbon atoms, lower alkoxy of 1 to 4 carbon atoms, or di(lower)alkylamino having 1 to 4 carbon atoms in each alkyl group, or aralkyl selected from phenethyl or α-methylbenzyl; and X is selected from (A) the group

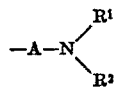

wherein A is selected from a straight or branched alkylene chain of 2 to 6 carbon atoms; $R^1$ and $R^2$ may be the same or different and are selected from hydrogen, lower alkyl of 1 to 3 carbon atoms, hydroxyalkyl, di(lower)alkylaminoalkyl, cycloalkyl of from 5 to 7 carbon atoms, phenyl, phenyl substituted with lower alkyl, or $R^1$ and $R^2$ together with the nitrogen atom to which they are attached may be a saturated heterocyclic group selected from pyrrolidino, piperidino, morpholino, piperazino or N-(lower alkyl)piperazino;

(B) the group

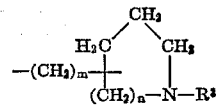

wherein m is a whole integer of from 0 to 3 with the proviso that when m is 0 the point of attachment of X may not be at either carbon atom alpha to the nitrogen atom; n is a whole integer of 1 or 2; and $R^3$ is selected from hydrogen or (lower)alkyl; or (C) the group

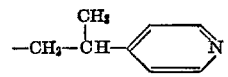

or a pharmaceutically acceptable acid addition salt thereof.

References Cited

Herz et al., J. Org. Chem., 24, 201–4 (1959).

STANLEY J. FRIEDMAN, Primary Examiner

U.S. Cl. X.R.

424—232, 248, 263, 267, 274

UNITED STATES PATENT AND TRADEMARK OFFICE
CERTIFICATE OF CORRECTION

PATENT NO. : 3,809,753
DATED : May 7, 1974
INVENTOR(S) : Robert Douglas MacKenzie, Charles Harmon Tilford It is certified that error appears in the above-identified patent and that said Letters Patent are hereby corrected as shown below:

Column 2, line 6 "$(CH_2)_n$-N-R" should read "$(CH_2)_n$-N-R$^3$".
Column 4, line 12 "poperidylmethyl" should read "piperidyl-methyl"; line 13 in Table I column 2 "30" should read "10".
Column 6, lines 24 and 25 "-CH$_2$-C(CH$_3$)(pyridyl)" should read "-CH$_2$-CH(CH$_3$)(pyridyl)".

Signed and Sealed this fourteenth Day of October 1975

[SEAL]

Attest:

RUTH C. MASON
*Attesting Officer*

C. MARSHALL DANN
*Commissioner of Patents and Trademarks*